J. H. Gage.
Forming Tires.
Nº 24,453.     Patented Jun. 21, 1859.
Fig: 1. 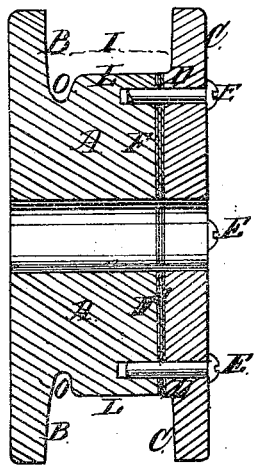   Fig: 2. 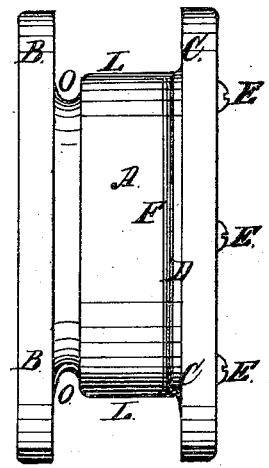
Witnesses;
Chas E Paige
Franklin Munroe.
Inventor;
John H. Gage.

UNITED STATES PATENT OFFICE.

JOHN H. GAGE, OF NASHUA, NEW HAMPSHIRE.

ROLL FOR FORMING TIRES.

Specification of Letters Patent No. 24,453, dated June 21, 1859.

*To all whom it may concern:*

Be it known that I, JOHN H. GAGE, of Nashua, county of Hillsboro, State of New Hampshire, have invented an Improved Tire-Forming Roll; and I do hereby declare that the following is a full and exact description of its construction and operation, reference being had to the accompanying drawings, and to the letters of reference marked thereon, so as to enable others skilled in the art to make and use my invention.

Figure 1, of the drawings represents a central section along the axis of the roll. Fig. 2 represents a side view of the roll.

The nature of my invention consists in the peculiar construction and relative arrangement of the parts composing the roll as will be hereafter described.

This roll is used for rolling tire; the flanges B, C, are intended to form the sides, the recess o, the flange, and the part L, the tread of the tire.

The roll is composed of the parts A, and C, and thin disk F, the part C, being provided with a narrow shoulder D, and the part A, with a flange B, recess O, and wide shoulder L.

The two main parts A, and C, of the roll together with the thin disk F, of sheet metal which are placed between the two parts A, and C, as fully shown in the drawings, are firmly fastened together, by means of screws E, so that the whole will be as substantial for all practical purposes as a solid roll.

The object of having the roll made in two pieces, is because after using the roll for a time the flanges will wear, so that the distance indicated by the dotted line I, from one flange to the other will become too large. When that occurs with a solid roll there is no remedy and the roll must be thrown aside and a new one be used instead of it. But with the roll made in two parts as represented in the accompanying drawings, the shoulder D, can be partially turned off or one of the sheet metal disks F, can be taken out and the pieces again be screwed together, when the distance I, between the flanges will again be right. It will be seen that this adjustment of the roll by means of taking out one of the disks, can be made by a common workman with great facility and without the labor and loss of time consequent upon placing the roll on a lathe, getting it true and turning it off. When however the flanges are worn so much that the adjustment by means of removing the disks, is not sufficient, or when the roll has already been several times adjusted and the last disk been taken out, then the shoulders D, or L, may be partially turned off, and the disks then inserted between the two parts of the roll, so as to serve for future adjustments. By this means one roll can be made to answer a very long time while it is capable of an easy and simple adjustment—an adjustment so simple that it can be effected by any ordinary workman.

I have thus described a tire forming roll which can be constructed before it leaves the shop so that it can be quickly adapted for rolling tires of different widths, as well as to roll tires of the same width, since by inserting or taking out the disks F, the distance between the flanges B, and C, will be varied, and this variation can be increased or lessened so as to suit almost any width of tire in ordinary use.

Having described my improvement what I claim as my invention and desire to secure by Letters Patent, as an improved tire forming roll, is—

The combination of the flange B, recess or depression O, wide shoulder or tread L, flange C, and short shoulder D, with a series of thin metallic disks F, said parts being constructed, arranged, and operating relatively to each other substantially in the manner and for the purpose set forth.

JOHN H. GAGE.

Witnesses:
CHAS. E. PAIGE,
FRANKLIN MUNROE.